United States Patent

[11] 3,576,575

[72] Inventors George A. Hellwarth
Deerfield Beach, Fla.;
Gardner D. Jones, Jr., Raleigh, N.C.
[21] Appl. No. 777,789
[22] Filed Nov. 21, 1968
[45] Patented Apr. 27, 1971
[73] Assignee International Business Machines Corporation
Armonk, N.Y.

[54] BINARY CODED DIGITAL TO ANALOG CONVERTER
8 Claims, 8 Drawing Figs.

[52] U.S. Cl. ........ 340/347DA
[51] Int. Cl. ........ H03k 13/02
[50] Field of Search ........ 340/347

[56] References Cited
UNITED STATES PATENTS
3,422,423 1/1969 Kaszynski ........ 340/347
3,447,149 5/1969 Groth ........ 340/347

*Primary Examiner*—Maynard R. Wilbur
*Assistant Examiner*—Jeremiah Glassman
*Attorney*—Hanifin and Hancin

ABSTRACT: Apparatus for converting binary coded digital signals into analog signals, in which the initial digital signal is at first converted into a pulse whose duration is representative of said digital signal, then integrated. Also disclosed are some improvements allowing harmonics to be reduced, more particularly by combining a first pulse whose duration is representative of the binary value of the digital signal with a second pulse whose duration is representative of the binary complement of the value of said digital signal.

INVENTORS
GEORGE A. HELLWARTH
GARDNER D. JONES, JR.

BY Hanifin & Clark
ATTORNEYS

BINARY CODED DIGITAL TO ANALOG CONVERTER

BACKGROUND OF THE INVENTION

1. Field of the Invention

The invention relates to means for translating one code into another, and more specifically for converting digital data into analog data.

2. Description of the Prior Art

In many information handling systems in which numerical data are processed in binary coded form, such as binary coded decimal (BCD) form, it is sometimes desirable to have the output data in analog form and, accordingly, to convert the signals that appear in BCD form into a continuously varying waveform.

Likewise, in some analog data transmission systems, such as telemetering systems, it is desirable to convert the initial analog data into a digital form and to transmit them in a binary coded signal form such as pulse code modulated (PCM) signals and, then, to retrieve the original analog waveform at a remote receiving station. It is therefore necessary to provide means at the receiving station for converting the incoming PCM signals into analog form signals.

It is well known to convert binary coded data into analog data. For instance, it is known to convert a binary number into a train of pulses having different durations according to the bit they represent and then to integrate this train of pulse for providing the analog data corresponding to said binary number. However, most of the converters of the prior art either require high accuracy components or provide bad quality analog signals, generally carrying a high ratio of harmonics.

SUMMARY OF THE INVENTION

It is one of the main objects of this invention to provide an improved apparatus for converting binary coded signals into analog signals.

It is another object of the invention to convert from binary coded signals to analog signals without necessitating most of the linear components which are normally required.

Still another object of the invention is to convert a binary coded signal into an analog signal while maintaining a high performance-to-cost ratio.

A further object of the invention is to provide for a high reduction of both even and odd harmonics which are usually generated in the conversion, thus providing a high signal-to-noise ratio.

According to a first aspect of the invention, a digital to analog converter is provided, which includes a buffer for storing successively each of the incoming binary coded signals and a binary counter operating at a clock frequency. A digital comparator compares at any instant the buffer and the counter contents and, when an equality is detected, issues an output pulse which sets a latch. This latch is reset each time the counter reaches its maximum value, which is determined by an AND gate detecting said value. The output of the latch controls a two position switch which provides a first direct voltage level when controlled and a second voltage level equal to but of opposite polarity to said first level when not controlled. The consequent two level waveform appearing at the switch output is then integrated to provide the analog signal. Another binary coded signal is then introduced into the buffer after completion of a whole counting cycle of the counter, the counter starts again counting from zero, and the same operation is repeated.

According to another aspect of the invention, a digital to analog converter is provided, which includes a buffer for storing successively each of the incoming binary coded signals and a binary counter operating at a clock frequency. A first digital comparator compares at any instant the buffer and the counter contents and, when an equality is detected, issues an output signal which sets a first latch. A second digital comparator compares at any instant the counter contents and the binary complement of the buffer contents and, when an equality is detected issues an output signal which sets a second latch. Both first and second latches are reset each time the counter reaches its maximum value. The first latch output controls a first two position switch delivering respective +V or −V voltage levels according to whether it is controlled or not and the second latch output controls a second two position switch delivering respective −V or +V voltage levels according to whether it is controlled or not. Both two-level waveforms thus appearing at both first and second switch outputs are now summed, then integrated to provide the analog signal. The same operation is repeated with the following incoming digital signal after completion of a whole counting cycle of the counter.

According to still another aspect of the invention, a digital to analog converter is provided, which includes a $n$-bit buffer for storing successively each of the incoming $n$-bit binary coded signals and a $(n+1)$ bit binary counter operating at a clock frequency. A digital comparator compares at any instant the value in the buffer with the first $n$ bits in the counter and, when an equality is detected issues an output signal which sets a latch. This latch is reset each time the first $n$-bit in the counter reach their maximum value. The latch output controls a two position switch delivering a +V or −V voltage level according to whether it is controlled or not. As the value in the buffer is necessarily comprised between zero and $2^n$ and only the first $n$ bits of the counter are compared with the buffer contents, the comparator will detect a first equality between the 1st and the $2^n$th state of the counter and a second equality between the $(2^n+1)$th and $2^{n+1}$th state of the counter. As likewise the latch is reset for the $2^n$th and for the $2^{n+1}$ states of the counter two similar two level waveforms will appear successively at the switch output, each of them being representative of the incoming digital signal. These two sucessive waveforms are then integrated to provide an analog signal which corresponds to the incoming digital signal. A new digital signal is introduced into the buffer after each complete counting cycle of the counter, and the same operation is repeated.

The foregoing and other objects, aspects and advantages of the invention will be more easily understood from the following description of specific embodiments when read in connection with the accompanying drawings.

DESCRIPTION OF THE PREFERRED EMBODIMENTS

Figure 1:
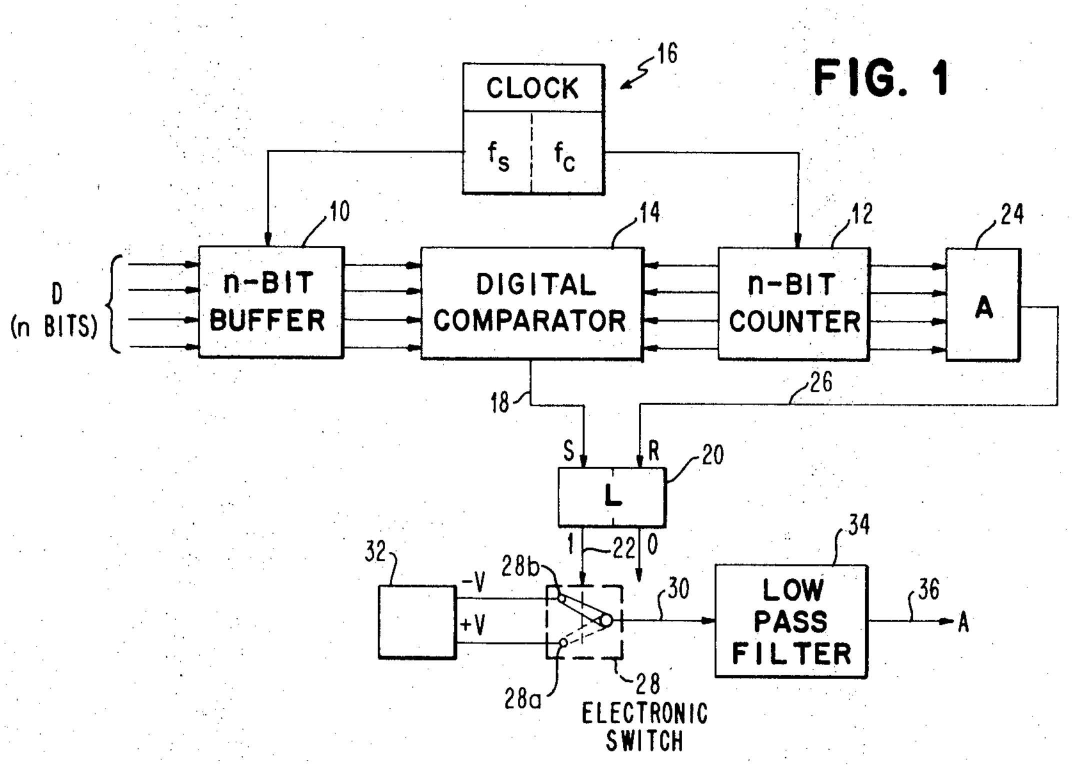
FIG. 1 shows the basic configuration of a first converter according to the invention.

FIG. 1 shows the basic configuration of a converter according to the invention. This converter comprises essentially a $n$-bit buffer 10 in which the incoming binary coded digital signals D are successively stored, a $n$-bit binary counter 12 and a digital comparator 14. A clock 16 delivers counting pulses to counter 12 at a frequency $f_c$ and strobe pulses to buffer 10 at a frequency $f_s$. Comparator 14 compares at any instant each bit in the buffer with each corresponding bit in the counter. At the moment the buffer and counter contents are identical, comparator 14 sends a pulse through line 18 to the SET input of latch 20 thus enabling output line 22 of said latch. Output line 22 is the "direct" output or 1 output of latch 20; in the present case the "inverse" output or 0 output is not used. On the other hand, when counter 12 reaches its $2^n$th state, this state is detached by AND gate 24, which sends then a pulse through line 26 to the reset input of latch 20, thus disabling output line 22. Line 22 controls two position high speed electronic switch 28 which, according as line 22 is ON or OFF, produces a −V or +V voltage signal on its output line 30 from one or the other polarity of two regulated voltage supply 32. Switch 28 is represented as an electromechanical switch for clarity purposes, only. This output signal is integrated in a conventional low pass filter 34 the output 36 of which delivers the analog representation A of digital signal D.

An example of operation of this converter will be now described by reference to both FIGS. 1 and 2*a* thru 2*c*. In order to simplify the explanation, it will be assumed that the incoming data are 4-bit parallel coded signals, and that the strobe pulse period $t_s=1/f_s$ is equal to the minimum time T needed for converting each digital signal into width modulated pulses. As the incoming data may have 16 different values, T will be equal to $16t_c$, $t_c$ being the counting pulse period $1/f_c$, and two consecutive strobe pulses will be separated by a time interval of $16t_c$ synchronized by clock 16. It will be also assumed that the first incoming signal is 10, i.e. 1010 in binary form, the second one a 13, i.e. 1101 in binary form, and the third one a 6, i.e. 0110 in binary form. These signals are shown in a parallel coded form at FIG. 2*a*. It is well understood that, if they are available in a serial coded form, it will be only necessary to deserialize them before or within the buffer.

Figure 2A:
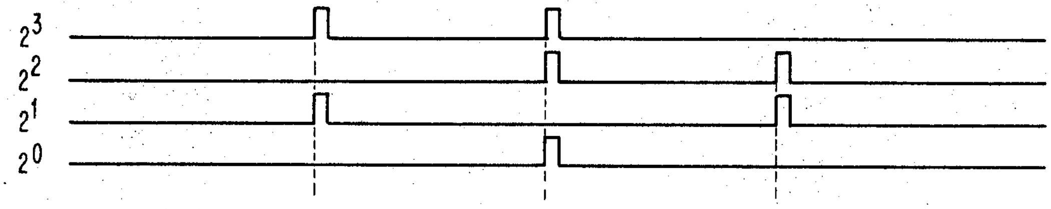
FIGS. 2*a* thru *c* show timing schemes illustrating the operation of the converter of FIG. 2.
Figure 2B:
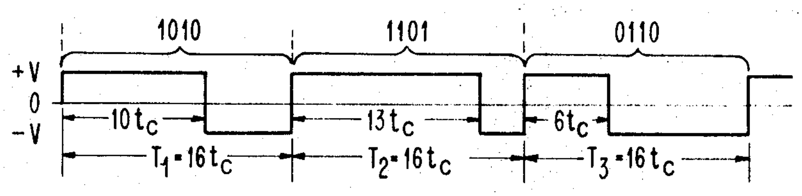

At starting time buffer 10 is loaded with the first signal 1010 under control of the first strobe pulse and counter 12 starts counting from initial value 0000 under control of counting pulses from clock 16. Latch 20 is initially in its RESET state and, and accordingly, line 22 is not fed; switch 28 is in position 28*a* and line 30 at a +V voltage level. When counter 12 reaches value 1010 i.e., after 10 counting pulse periods $t_c$, comparator 14 sends a pulse on line 18, thus setting latch 20 and turning switch 28 to position 28*b*. Line 30 is then brought to a −V level and remains at this level until counter 12 reaches its 16th value, i.e. 1111 after a time $T_1$ which corresponds to $16t_c$: indeed at this time AND gate 24 sends a pulse through line 26, latch 20 is then reset, switch 28 turned back to position 28*a* and line 30 brought back to a +V level. FIG. 2*b* shows the resulting signal on line 30. This signal is composed of a first +V level positive pulse having a duration corresponding to 10 counting pulses and a second −V level negative pulse having a duration corresponding to 6 counting pulses. This signal is perfectly representative of the incoming binary signal since the duration of its positive part is proportional to the binary value of said signal within $T_1$ which is equal to time T. The volt second are of voltage on line 30 is proportional to the analog signal represented by the incoming digital signal. FIG. 2*b* gives also the representation of the two other incoming signals 1101 and 0110 on line 30 which are converted during the two following periods, $T_2$ and $T_3$. The positive parts of these signals have respective durations within periods $T_2$ and $T_3$, say $13t_c$ and $6t_c$, which are proportional to the value of the corresponding incoming digital signals.

Figure 2C:
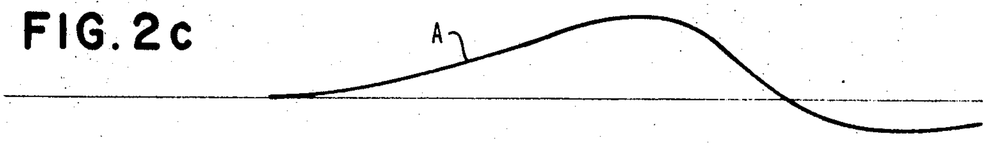

FIG. 2*c* shows the analog waveform issuing from low pass filter 34, drawn without accounting for propogation delay through said filter, and corresponding to the previous successive three digital signals. Although reference voltage levels have been chosen symmetrical with respect to zero level, they could be chosen differently, for instance zero and +V, or $V_1$ and $V_2$, depending upon the analog information which is at the origin of the digital signals D to be converted and possibly upon the further operations which are to be made on the issuing analog signal.

Figure 3:
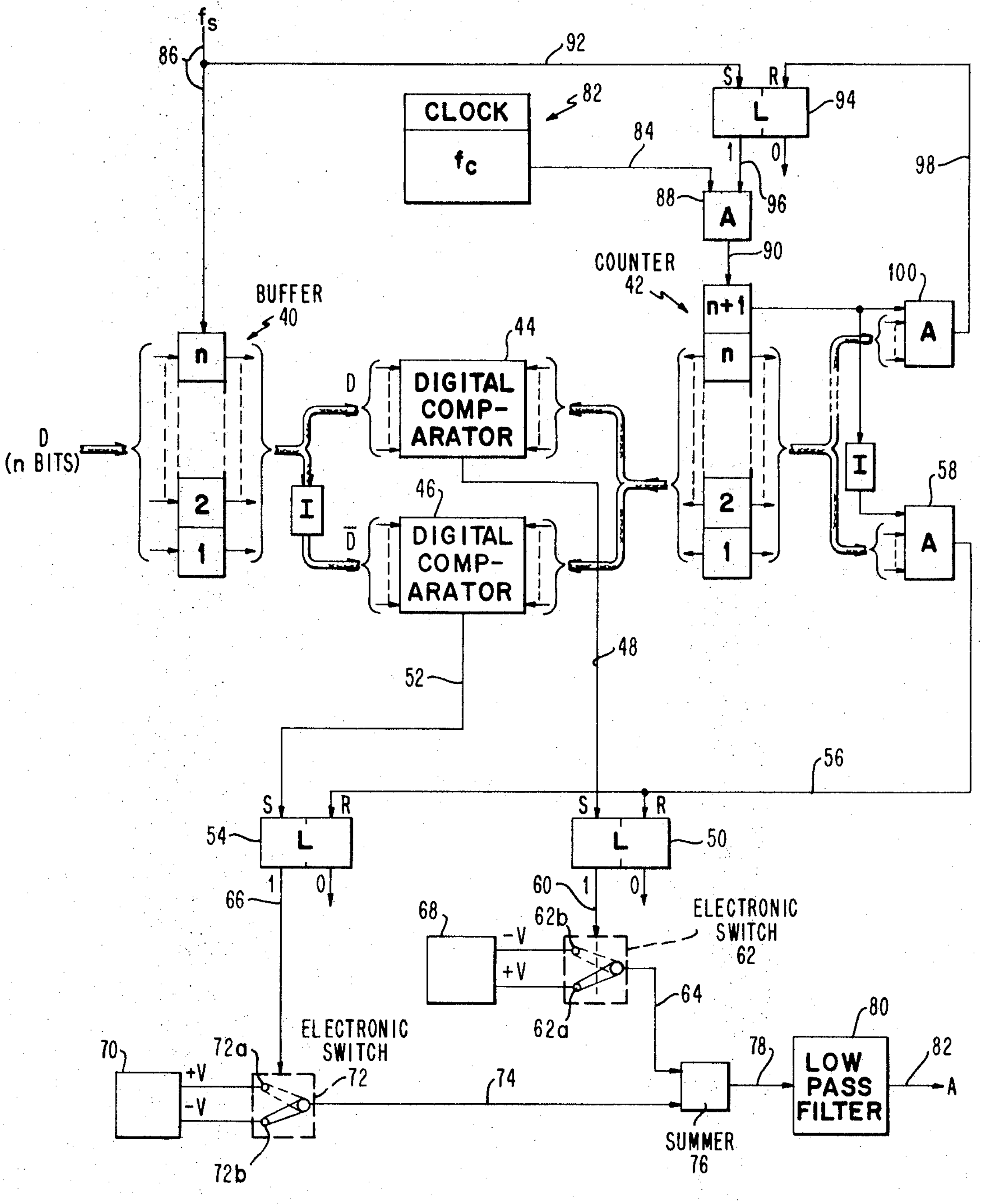
FIG. 3 shows the basic configuration of a second converter according to the invention.

Referring to FIG. 3 an improved converter will be described whose performance allows the conversion of digital inputs with a relatively high number of bits. The improved converter employs means of reducing the normal harmonic distortions encountered in converting the digital signals to a pulse width modulated signal as is done in the basic converter. These harmonics determine a limit on the accuracy of the converter and must be reduced to allow this conversion process to be used with digital signals of relatively high bit number.

This low harmonic converter comprises essentially a *n*-bit buffer 40 in which each incoming binary coded digital signal D is momentarily stored, a $(n+1)$ stage binary counter 42, and two digital comparators 44 and 46. Comparator 44 compares at any instant the *n* bits in the buffer with the first *n* bits in the counter; comparator 46 compare at any instant the binary complement of the *n* bits in the buffer with the first *n* bits in the counter. When an equality is detected by comparator 44, a pulse is sent through line 48 to the SET input of a first latch 50. In the same way when an equality is detected by comparator 46, a pulse is sent through line 52 to the SET input of a second latch 54. Both RESET inputs of latches 50 and 54 are connected, through line 56, to AND gate 58 which is enabled whenever counter 42 is in its $2^n$th state. Direct output line 60 of latch 50 drives a first two position electronic switch 62 which, according as line 60 is ON or OFF, produces a −V or +V voltage signal on its output line 64 from one or the other polarity of two regulated voltage supply 68. Output line 66 of latch 54 is connected to a second two position electronic switch 72 which, according as line 70 is ON or OFF, produces a +V or −V voltage signal on its output line 74 from one or the other polarity of two regulated voltage supply 70. It must be emphasized that, due to the opposite polarities of switches 62 and 72 as seen in the drawing, when both latches 50 and 54 are in the same state, these switches deliver voltages of opposite polarities. Signals from lines 64 and 74 are added in analog summer 76 and the resulting signal is applied through line 78 to low pass filter 80 for integration. Output line 82 of filter 80 delivers the reconstructed analog signals A.

Operation timing is provided by a clock 82 which delivers counting pulses on line 84 at frequency $f_c$(period $t_c=1/f_c$), and by the data interface to the converter which provides strobe pulses on line 86 at frequency $f_s$ (period $t_s=1/f_s$). Lines 84 controls the counter operation through AND gate 88 and line 90, and line 86 controls the entering of data into the buffer. A branch 92 of line 86 is connected to the SET input of a latch 94 whose output line 96 is connected to another input of gate 88. The RESET input of latch 94 is controlled by output line 98 of AND gate 100, which gate is enabled when counter 42 is in its $2^{n+1}$th state.

Operation of the converter of FIG. 3 will be now described with reference to both FIGS. 3 and 4. It will be assumed, in this particular example of operation, that the converter works on an asynchronous basis, which allows such a converter to be made free of any synchronization problem—for this it is only necessary that period $t_c$ of counting pulses be such that the time which is necessary for having the complete conversion of one incoming digital signal made, i.e. $2_{n+1}t_c$, be smaller than the period $t_s$ of strobe pulses provided by the data interface to the converter.

At rest conditions latches 50, 54, and 94 are in RESET state and counter 42 contains "all zeros." Buffer 40 is loaded with the first incoming signal as soon as the first strobe pulse appears on line 86, and counter 42 starts counting under control of counting pulses appearing on line 90. As a matter of fact, the first strobe pulse appearing on line 86 sets latch 94 through line 92, thus enabling AND gate 88 at each counting pulse. As long as comparators 44 and 46 do not detect equality, latches 50 and 54 remain in their RESET states, and accordingly switch 62 is in position 62*a*, and switch 72 in position 72*b*. Line 64 is therefore at a +V voltage level, line 74 at a −V voltage level, and line 78 at zero level.

It will be assumed that the first incoming signal $D_1$ has a value higher than $2^n/2$, which means that the binary complement $\overline{D}_1$ of $D_1$ is smaller than $D_1$. In such a case comparator 46 will detect the first equality, at time $t_1$ when counter 42 reaches value $\overline{D}_1$. At this time a signal is sent through line 52 and latch 54 is set. Line 66 is now activated and switch 72 turns to position 72*a*, thus bringing line 74 to a +V voltage level. As line 64 is still at a +V voltage level line 78 is brought to a +2V voltage level.

When counter 42 reaches value $D_1$, say at time $t_2$, comparator 44 sends a signal through line 48 and latch 50 is set. Line 60 is now activated and switch 62 turns to position 62*b* thus bringing line 64 to a −V voltage level. At this time line 78 is then brought back to a zero voltage since line 74 is still at a +V voltage level.

At time $2^n t_c$ counter 42 reaches its $2^n$th state, i.e. its first $n$ bits are 1's and its $(n+1)$th bit a 0. Then AND gate 58 sends a signal on line 56 which resets both latches 50 and 54. Accordingly, switch 62 turns back to position 62*a* and switch 72 to position 72*b*. Line 64 comes back to a +V level, line 74 to a −V level and accordingly line 78 remains at zero level.

Digital signal $D_1$ remains in buffer 40 since no strobe pulse has been sent and counter 42 goes on counting from its $(2^n+1)$th state, i.e. its first $n$ bits being "zeros" and its $(n+1)$th being a 1. As already seen above, when the first $n$ bits of counter 42 equals the $n$ bits of the complement $\bar{D}_1$ of $D_1$, say at time $t_3=2^n t_c+_1$, line 74 is brought to a +V level and line 78 to a +2V level; in the same way, when the first $n$ bits of counter 42 equals the $n$ bits of $D_1$, say at time $t_4=2^n t_c+t_2$, line 64 is brought to a −V level and line 78 brought back to zero level.

When counter 42 reaches its $2^{n+1}$th state, say at time $T=2^{n+1}t_c$, this state is detected by AND gate 100 which, through line 98, resets latch 94, thus disabling AND gate 88 and preventing the counting pulses from reaching counter 42. Accordingly counter 42 stops, waiting for the next strobe pulse which will set latch 94. During the corresponding wait time $t_w=t_s-T$, line 78 remains at zero level since latches 50 and 54 have received no new control pulses.

As soon as the next strobe pulse appears on line 86, signal $D_1$ is removed from buffer 40 and replaced by the next incoming signal $D_2$, while counter 42 starts counting again under control of counting pulses now passing through AND gate 88.

Figure 4:
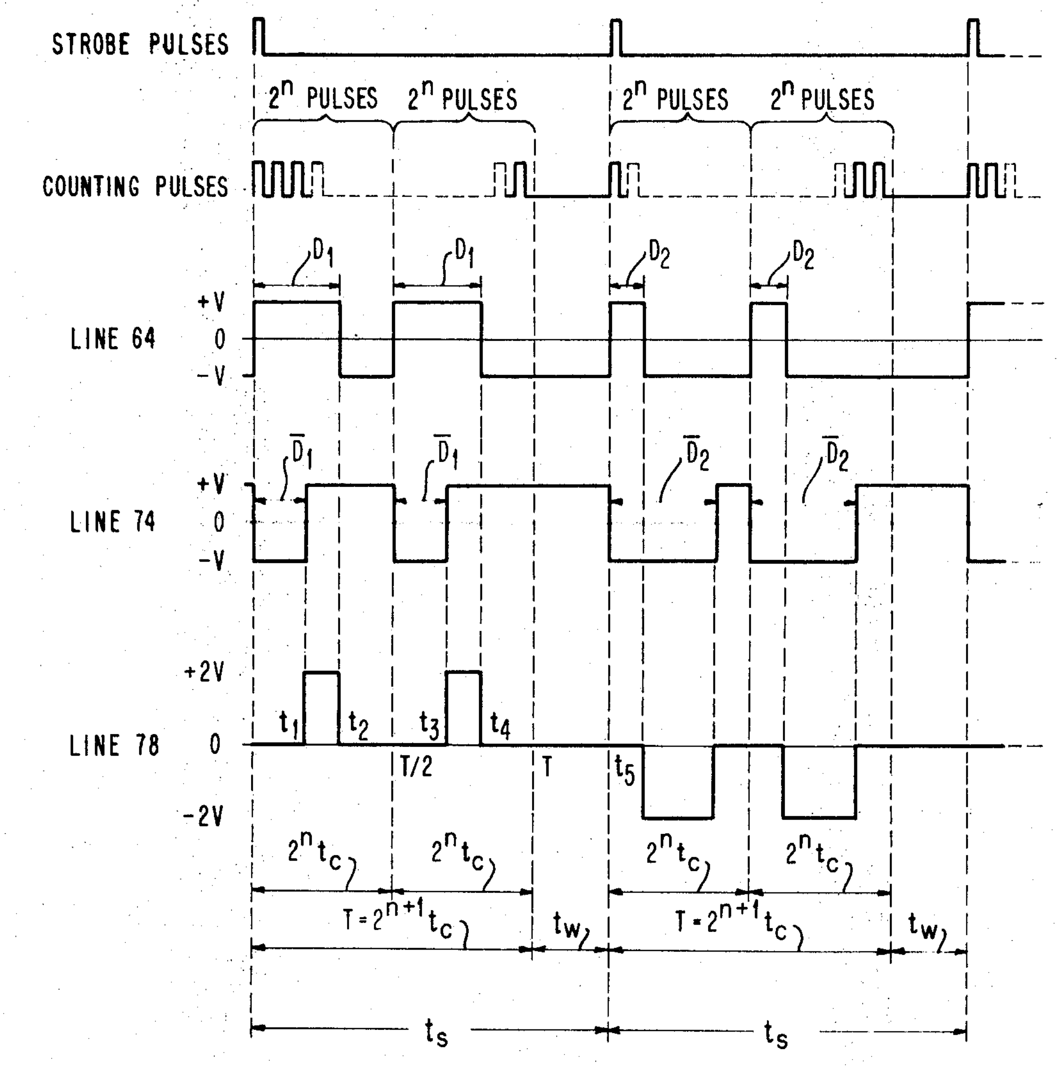
FIG. 4 shows timing schemes illustrating the operation of the converter of FIG. 3.

FIG. 4 shows the shape of the signals on respective lines 64, 74 and 78 for two successive incoming digital signals $D_1$ and $D_2$ with respect to the strobe and counting pulses. $D_2$ has been chosen lower than $2^n/2$, so that the resulting signal on line 78 is constituted by pulses of −2V level.

As can be seen from the above description and FIGS. 3 and 4, the improved converter of FIG. 3 comprises two essential features:

- the first feature is based upon the conversion of the incoming signal into two components respectively representative of the binary value and of the complement value of said incoming signal, and the combination of said two components so as to obtain a resulting signal the significant part of which has an amplitude which is twice the amplitude of the components. This feature allows therefore to reinforce the significant part of the resulting signal and in addition to greatly reduce the even harmonics which are generated during the conversion: as a matter of fact the even harmonics contained in both components have same amplitudes but opposite phases, and accordingly cancel each other. Of course, this first feature may be used independently from the second one. In such a case a counter with $n$ stages only is needed, and a single AND gate detecting the $2^n$th state of this counter may be used for both resetting latches 50 and 54 on the one hand and latch 94 on the other hand.
- the second feature is to provide for several successive transformations of the same digital signal, each transformation converting said signal into a pulse whose duration is representative of said digital signal. This feature allows the odd harmonics generated during the conversion to be greatly reduced. Experimental studies indicate that only two consecutive transformations are sufficient for providing a satisfactory signal-to-noise ratio in most cases, but a greater number of identical transformations of each incoming signal might be made if needed by further increasing the clock frequency $f_c$.

This second feature may also be used independently from the first one. If only two transformations of each incoming digital data are needed, it would be only necessary to cancel digital comparator 46, latch 54, switch 72, summer 76, and the associated circuitry, in the device of FIG. 3; if more than two transformations are needed the following additional modifications will be necessary:

- replacing the $(n+1)$ stage counter by a $(n+k)$ stage counter (with $k$ any integer greater than 1) for providing $k+1$ transformations;
- providing means for detecting any of the $2^n$th, $2^{n+1}$th, ... $2^{n+k1a1}$th states of the counter and resetting latches; these means might be a single AND gate such as 58 detecting all 1's in the first $n$ stages of the counter and a 0 in the $(n+k$ stage;
- providing an AND gate such as 100 for detecting the $2^{n+k}$th state of the counter and resetting latch 94.

The converter of FIG. 3 may also be operated on a synchronous basis. In such a case the strobe pulses are delivered by clock 82 in the same way as in the embodiment which will now be described with reference to FIGS. 5 and 6.

Figure 5:
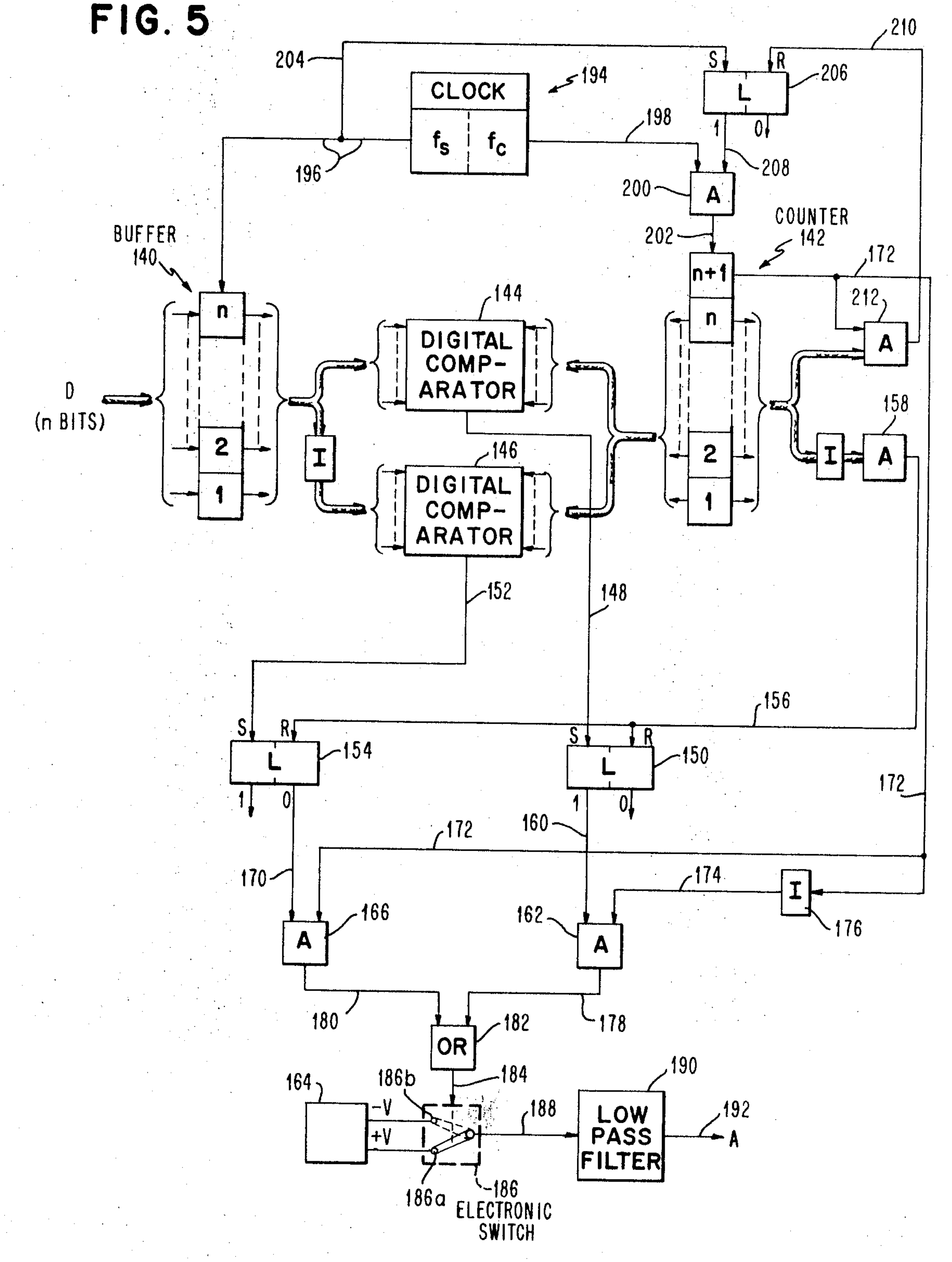
FIG. 5 shows the basic configuration of a third converter according to the invention.

The improved converter of FIG. 5 comprises essentially a $n$-bit buffer 140 in which the incoming binary coded digital signals D are momentarily stored, a $(n+1)$ stage binary counter 142, and two digital comparators 144 and 146. Comparator 144 compares at any instant the $n$ bits in the buffer with the first $n$ bits in the counter; comparator 145 compares at any instant the binary complement of the $n$ bits in the buffer with the first $n$ bits in the counter. When an equality is detected by comparator 144, a signal is sent through line 148 to the SET input of a first latch 150. In the same way when an equality is detached by comparator 146, a signal is sent through line 152 to the SET input of a second latch 154. Both RESET inputs of latches 150 and 154 are controlled through line 156 by AND gate 158 which is enabled whenever counter 142 contains zeros in its first $n$ stages, i.e. when it is in its 1st or $(2^n+)$th state. Direct output line 160 of latch 150 is connected to the first input of a first AND gate 162; inverse output line 170 of latch 154 is connected to a second AND gate 166. The inverse output of latch 150 and direct output of latch 154 are not used. Second input of AND gate 166 is controlled by line 172 which is connected to the $(n+1)$th stage of counter 142: therefore line 172 will be activated or not according as this stage contains respectively a 1 or a 0. The second input of AND gate 162 is controlled by the output line 174 of an inverter 176 the input of which is connected to line 172. Therefore line 174 will be activated only if the $(n+1)$th stage of counter 142 contains a 0. Respective output lines 178 and 180 of AND gates 162 and 166 enter OR gate 182. Output line 184 of gate 182 drives an electronic high speed two position switch 186 which, according to whether line 184 is activated or not, produces a −V or +V voltage level on its output line 188 from one or the other polarity of two regulated voltage supply 164. This signal is then integrated in low pass filter 190 whose output 192 delivers the reconstructed analog signal A. Operation timing is provided by a clock 194 which delivers strobe pulses of frequency $f_s$ (period $1/f_s=t_s$) on line 196 and counting pulses of frequency $f_c$ (period $1/f_c=t_c$) on line 198. In the case of an asynchronous operation the strobe pulses would be provided by the data interface to the converter (as in the previous embodiment) instead of clock 194. Line 196 controls the entering of the incoming data into buffer 140, and line 198 controls the counter operation through AND gate 200 and line 202. A branch 204 of line 196 is connected to the SET input of a latch 206 whose output line 208 is connected to another input of AND gate 200. The RESET input of latch 206 is controlled by output line 210 of AND gate 212, which is enabled whenever the $2^{n+1}$th state of counter 142 is reached.

Operation of the converter of FIG. 5 will be now described with reference to both FIGS. 5 and 6. In this particular embodiment, it will be assumed that the converter works on a synchronous basis, in which case period $t_s$ of strobe pulses is choosen equal to the time T which is necessary for having the complete conversion of one digital signal made.

At initial conditions, counter 142 contains all 1's which correspond to its $2^{n+1}$th state because at each end of operation, the detection of this state by AND gate 212 causes latch 206 to be reset and, accordingly, AND gate 200 to be disabled and counter 142 to be stopped on this state. Latches 150 and 154 may be in SET or RESET state: at any rate, as will be just seen, both will be reset at the starting of operation.

As soon as the first strobe pulse appears on line 196, buffer 140 is loaded with the first incoming signal $D_1$; latch 206 is set by the strobe pulse on line 204, thus enabling AND gate 200, and counter 142 starts counting under the control of counting pulses from clock 194. As soon as the first counting pulse appears, counter 142 reaches its first state, i.e. "all zeros" in the $(n+1)$ stages, since it contained "all one" before starting, as seen above. At this time, detection by gate 158 of zeros in the first $n$ stages of counter 142 causes latches 150 and 154 to be reset. Lines 174 and 170 are activated but AND gates 162 and 166 are not enabled since their respective other input lines 160 and 172 are not activated (latch 150 is in RESET state and last stage of counter 142 contains a zero). Therefore lines 178, 180 and accordingly 184 are not activated, and switch 186 is in its position 186*a*, thus delivering a +V level on line 188.

If it is assumed that the value of the first incoming signal $D_1$ is higher than its binary complement $\overline{D}_1$, the first equality will be detected by comparator 146, when counter 142 reaches the value according to which its first $n$ bits are equal to those of $\overline{D}_1$. Latch 154 is then set and accordingly line 170 is no longer activated since this line is connected to the "inverse" output of the latch. Gate 166 is still not enabled and no change occurs on the state of line 188.

When counter 142 reaches the value according to which its first $n$ bits are equal to those of $D_1$, say at time $t_1$, latch 150 is set, and accordingly line 160 activated. As line 174 is also activated (last stage of counter 141 still contains a zero since the $2_n$th state has not yet been reached), AND gate 162 is enabled; its output signal reaches switch 186, through line 178, OR gate 182 and line 184. Switch 186 turns to position 186*b* thus bringing line 188 to −V level.

Counter 142 reaches its $(2^n+1)$th state, i.e. its first $n$ stages containing all zeros and its $(n+1)$th stage containing a 1, at a time $2^n t_c = t_s/2$. At this time, lines 156 and 172 become activated thus resetting latches 150 and 154, and enabling AND gate 166 since line 170 becomes also activated (inverse output line of the latch). AND gate 162 is disabled since line 174 is no longer activated, but as AND gate 166 is now enabled, a control signal is still received by switch 186, which accordingly remains in position 186*b*. Line 188 is therefore maintained at −V level.

When counter 142 reaches the value according to which its $(n+1)$th stage contains a 1 and the other stages contain the value corresponding to $\overline{D}_1$, say at time $t_2 = t_s - t_1$, comparator 146 sends a pulse through line 152 and latch 154 is set. Line 170 is no longer activated and gate 166 is disabled. As gate 162 is still disabled, no more control signal reaches switch 186 which, accordingly, turns back to position 186*a*. Line 188 is brought back to a +V level.

When the counter 142 reaches the value according to which its $(n+1)$th stage contains a 1 and the other stages contain the value corresponding to $D_1$, comparator 144 sends a pulse through line 148 and latch 150 is set. However as line 174 is still not activated (since there is a 1 in the last stage of counter 142) gate 162 remains disabled and no control signal is sent to switch 186; no voltage change occurs on line 188.

When counter 142 reaches its $2^{n+1}$th state, i.e. all $(n+1)$ stages containing "ones," AND gate 212 is enabled and the corresponding output signal on line 210 resets latch 206. Line 208 is no longer activated, AND gate 200 is disabled and counting pulses from clock 194 cannot reach counter 142, which stops. Counter 142 stops only during a time equal to one counting pulse period $t_c$: as a matter of fact as the converter works on a synchronous basis, the period $t_s$ of strobe pulses has been chosen equal to $2^{n+1}t_c$ and accordingly a new strobe pulse appears on line 196 at time $(2^{n+1}+1)\ t_c$ i.e. a time $t_c$ after the time when counter reached its $2^{n+1}$th state. While the counter is stopped no change occurs in the circuits.

As soon as the new strobe pulse appears on line 196, latch 206 is set again and counter 142 starts counting again from its first state, i.e. "zeros" in all stages. Latches 150 and 154 are then reset and a similar operation starts again with the next incoming signal $D_2$ just entering buffer 140 under the control of the same strobe pulse.

Figure 6:
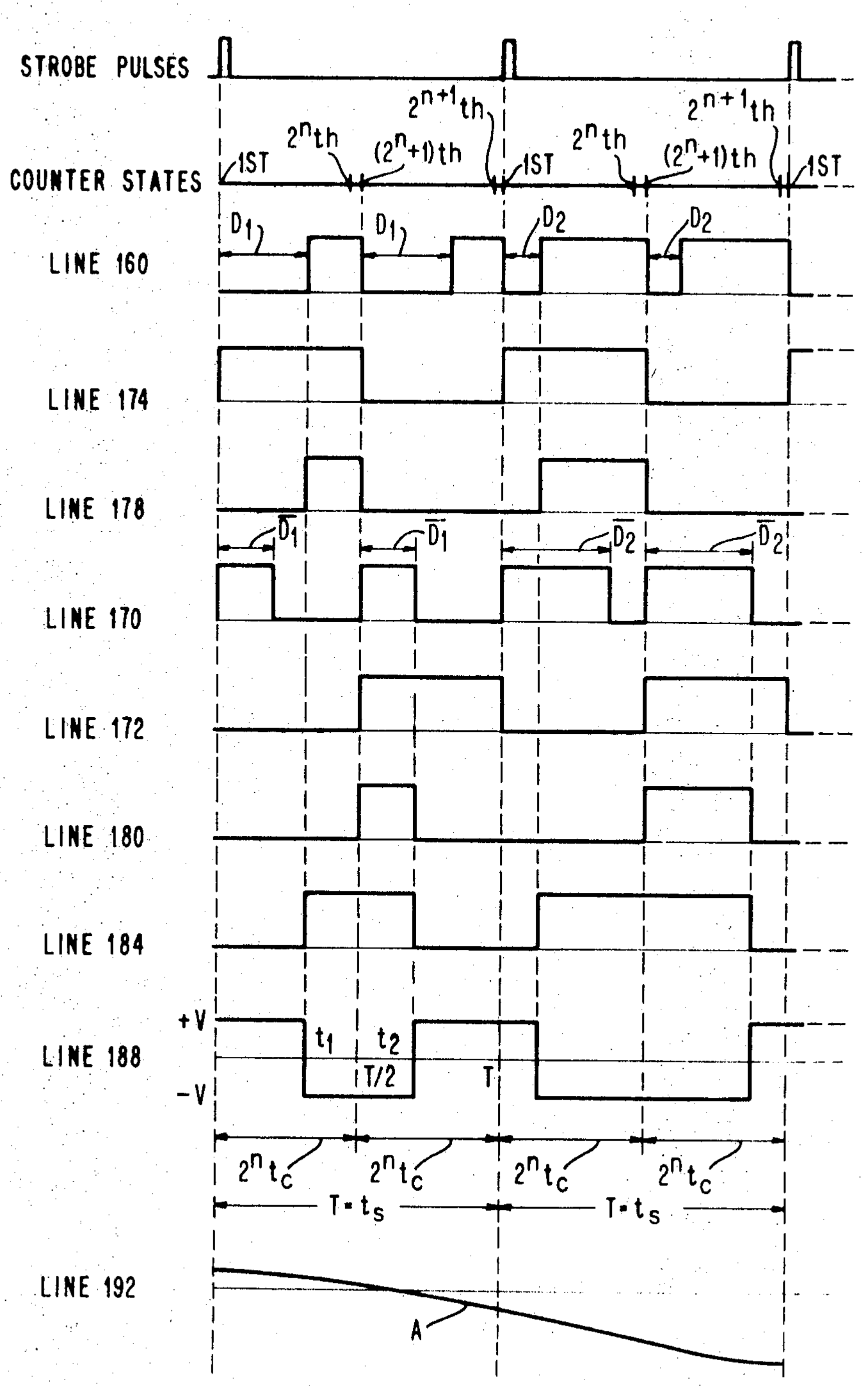
FIG. 6 shows timing schemes illustrating the operation of the converter of FIG. 5.

FIG. 6 shows the different signals in respective lines 160, 174, 178, 170, 172, 180, 184, 188 and 192 corresponding to two successive incoming signals $D_1$ and $D_2$ with respect to the strobe pulses and the counter states. The shape of the reconstructed analog signal A on line 192 has been drawn without accounting for propagation delay through filter 190.

The main difference between the embodiment of FIG. 5 and that of FIG. 3 is that instead of summing the primary signal and its complementary signal, the two are alternated so that each appears during one-half of the total time needed for converting the incoming signal into an analog signal. One advantage of the embodiment of FIG. 5 over that of FIG. 3 is that it needs only one bipolar switch instead of two, and no analog summing device. In addition, as can be seen from FIG. 6, the resulting signals on line 188 have a volt-second area symmetrically distributed about the center of the conversion time period T; this symmetry of area allows said signals to have still lower even harmonic content.

Of course the two signals could be also alternated several times during the total conversion time provided the two signals appear the same number of times within the total conversion period T. In such a case, if $n$ is the number of bits of the incoming signal, it could be only necessary to have a $(n+k)$ stage counter, $k$ being an odd integer.

The present invention is not restricted to the specific embodiments which have been described with reference to the accompanying drawings. In particular, the different improvements described with reference to FIGS. 3 and 6, say more specifically the provision of two complementary signals and their combination by analog summing or by alternating them, and the provision of several consecutive conversions of a same incoming signal, may be used whatever be the means of obtaining the primary signal, provided said primary signal be representative of the incoming digital signals.

We claim:

1. Binary coded digital to analog converter comprising:

a $n$-bit buffer for storing a $n$-bit binary coded signal which is to be converted into analog signals, first generating means for generating a first two level voltage waveform representative of the value in said buffer, second generating means for generating a second two level voltage waveform representative of the binary complement of said value in the buffer, inverting means for inverting the polarity of said second waveform, summing means for summing the output signals from said first generating means and from said inverting means, thereby providing a third waveform, and filter means responsive to said third waveform for providing an analog signal corresponding to said $n$-bit binary coded signal.

2. Binary coded digital to analog converter comprising:

a $n$-bit buffer for storing successively different $n$-bit binary coded signals which are to be converted into analog signals, first clock means generating timing pulses at a first frequency for controlling the entering of said different binary coded signals into said buffer, thus determining a period of time T during which each of said binary coded signals remains in said buffer, first generating means for generating a first two level voltage waveform representative of the binary value of the signal in the buffer during said period T, second generating means for generating a second two level voltage waveform representative of the binary complement of the value in the buffer during said same period T, inverting means for inverting the polarity of said second waveform, summing means for summing the output signals from said first generating means and from said inverting means, thereby providing a third waveform, and means for integrating said third waveform to provide an analog corresponding to said binary coded signal.

3. Binary coded to analog converter comprising:

$n$-bit buffer for storing successively different $n$-bit binary coded signals which are to be converted into analog signals, first clock means generating timing pulses at a first frequency for controlling the entering of said different binary coded signals into said buffer, a $n$-bit counter, a second clock means generating timing pulses at a second frequency for causing said counter to increase in value, said second clock frequency being at least equal to $2^n$ times said first clock frequency, detecting means for detecting the maximum value of the counter and providing a first control pulse each time said maximum value is detected, a first digital comparator comprising at any instant the value in the counter and the value in the buffer, and providing a second control pulse when equality is detected, first latch means controlled by said first comparator output and said detecting means output for providing a first direct voltage level in response to said first control pulse and a second direct voltage level upon occurence of said second control pulse thereby providing a first two level voltage waveform, a second digital comparator comparing at any instant the value in the counter and the binary complement of the value in the buffer, and providing a third control pulse when equality is detected, second latch means controlled by said second comparator output and said detecting means output for said second voltage level in response to said first control pulses and said first voltage level in response to said third control pulse, thereby providing a second two level voltage waveform, summing means for summing said first and second two level waveforms, thereby providing a third waveform, and means for integrating said third waveform to provide an analog signal corresponding to said binary coded signal.

4. Binary coded digital to analog converter according to claim 3 wherein:

said first latch means comprises:

a first bistable device controlled by said respective first and second control pulses so as to provide no output signal in response to said first control pulse and an output signal in response to said second control pulse, a first two position switch controlled by the output of said bistable device for providing said first voltage level when said output signal is present and said second voltage level when said output signal is not present;

said second latch means comprises:

a second bistable device controlled by said respective first and third control pulses so as to provide no output signal in response to said first control pulse and an output signal in response to said third control pulse, a second two position switch controlled by the output of said second bistable device for providing said second voltage level when said output signal is present and said first voltage level when said output signal is not present; and said second voltage level is equal in magnitude to said first voltage level but of opposite polarity.

5. Binary coded digital to analog converter comprising:

a $n$-bit buffer for storing successively different $n$-bit binary coded signals which are to be converted into analog signals;

first clock means generating timing pulses at a first frequency for controlling the successive enterings of said different binary coded signals into said buffer, thus determining a period of time T during which each of said binary coded signals remains in said buffer, said period T including at least two equal subperiods;

a $(n+k)$-bit counter, $k$ being any integer, second clock means generating timing pulses at a second frequency for causing said counter to increase in value, said second frequency being at least equal to $2^{n+k}$ times said first frequency, detecting means for detecting the maximum value of the first $n$ bits of the counter and providing a first control pulse each time said maximum value is detected, a digital comparator comparing at any instant the first $n$ bits in the counter and the value in the buffer and providing a second control pulse when equality is detected, latch means controlled by said comparator output and said detecting means output, for providing a first direct voltage level in response to said first control pulse and a second direct voltage level in response to said second control pulse thereby providing a two level voltage waveform;

timing means for operating said generating means during each of said subperiods, thereby providing at least two successive identical two level voltage waveforms each being representative of said current binary coded signal;

means for integrating said two successive waveforms to provide an analog signal corresponding to said current binary coded signal.

6. Binary coded digital to analog converter according to claim 5 wherein said latch means comprise:

a bistable device controlled by said respective first and second control pulses so as to provide no output signal in response to said first control pulse and an output signal in response to said second control pulse, and a two position switch controlled by the output of said bistable device for providing said first voltage level when said output signal is present and said second voltage level when said output signal is not present, said second voltage level being equal in magnitude to said first level but of opposite polarity.

7. Binary coded digital to analog converter comprising:

a $n$-bit buffer for storing successively different $n$-bit binary coded signals which are to be converted into analog signals, a $(n+1)$-bit counter, first clock means generating a first series of timing pulses at a first frequency for controlling the successive enterings of said binary coded signals into said buffer, second clock means the starting of which is controlled by the timing pulses of said first series, generating a second series of timing pulses at a second frequency for causing said counter to increase in value, said second frequency being at least equal to $2^{n+1}$ times said first frequency, first detecting means for detecting the $2^n$th state of the counter and providing a first control pulse when said state is detected, second detecting means for detecting the $2^{n+1}$th state of the counter and providing a signal for stopping said second clock means, until the occurrence of the following timing pulse of said first series, a first digital comparator comparing at any instant the value in the buffer with the first $n$ bits in the counter, and providing a second control pulse each time an equality is detected, first latch means controlled by said detecting means output and said comparator output for providing a first direct voltage level in response to said first control pulse and a second direct voltage level in response to said second control pulse thereby providing a first two level voltage waveform, a second digital comparator comparing at any instant the binary complement of the value in the buffer with the first $n$ bits in the counter, and providing a third control pulse each time an equality is detected, second latch means controlled by said detecting means output and said second comparator output for providing said second voltage level in response to said first control pulse and said first voltage level in response to said third control pulse thereby providing a second two level voltage waveform, summing means for summing said first and second two level waveform, thereby providing a third waveform,
filter means for integrating said third waveform to provide an analog signal corresponding to the current binary coded signal in the buffer.

8. Binary coded digital to analog converter comprising:
a $n$-bit buffer for storing successively different $n$-bit binary coded signals,
a $(n+1)$ bit counter,
first clock means generating a first series of timing pulses at a first frequency for controlling the successive enterings of said binary coded signals into said buffer,
second clock means the starting of which is controlled by the timing pulses of said first series, generating a second series of timing pulses for causing said counter to increase in value, said second frequency being equal to $2^{n+1}$ times said first frequency,
first detecting means for detecting the minimum value of the first $n$ bits in the counter and providing a first control pulse each time said minimum value is detected,
second detecting means for detecting the $2^{n+1}$th state of said counter and delivering a signal for stopping said second clock means, until the occurrence of the next timing pulse of said first series,
a first digital comparator comparing at any instant the value in the buffer with the first $n$ bits in the counter, and providing a second control pulse each time equality is detected,
a first bistable device controlled by said first detecting means output and said first comparator output so as to provide no output signal in response to said first control pulse and an output signal in response to said second control pulse,
first gating means for gating the output signal from said first bistable device when the $(n+1)$th stage of said counter contains a 0,
a second digital comparator comparing at any instant the binary complement of the value in the buffer with the first $n$ bits in the counter and providing a third control pulse each time equality is detected,
a second bistable device controlled by said first detecting means output and said second comparator output so as to deliver an output signal in response to said first control pulse and no output signal in response to said third control pulse,
second gating means for gating the output signal from said second bistable device when the $(n+1)$th stage of said counter contains a 1,
a two position switch controlled by the outputs of both said first and second gating means and delivering a first direct voltage level when a signal is present on anyone of said gating means outputs and a second voltage level when no signal is present on both said gating means outputs thereby providing a two voltage level waveform, and
means for integrating said waveform to provide an analog signal corresponding to the current binary coded signal in the buffer.

PO-1050
(5/69)

UNITED STATES PATENT OFFICE
CERTIFICATE OF CORRECTION

Patent No. 3,576,575 Dated April 27, 1971

Inventor(s) GEORGE A. HELLWARTH ET AL

It is certified that error appears in the above-identified patent and that said Letters Patent are hereby corrected as shown below:

Column 6, line 5 "$2^{n+klal}$" should be --$2^{n+k-1}$--.

Column 6, line 8 "(n+k stage" should read --(n+k)th st

Claim 2

Column 9, line 2 After "analog" insert --signal--.

Signed and sealed this 9th day of May 1972.

(SEAL)
Attest:

EDWARD M.FLETCHER,JR.
Attesting Officer

ROBERT GOTTSCHALK
Commissioner of Patents